(12) United States Patent
Choi et al.

(10) Patent No.: US 12,359,406 B2
(45) Date of Patent: Jul. 15, 2025

(54) DISPLAY SYSTEM FOR CONSTRUCTION MACHINE

(71) Applicant: VOLVO CONSTRUCTION EQUIPMENT AB, Eskilstuna (SE)

(72) Inventors: Yu Jun Choi, Changwon-si (KR); Myung Hoon Lee, Changwon-si (KR); Ji Hyuck Lee, Changwon-si (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 70 days.

(21) Appl. No.: 18/118,218

(22) Filed: Mar. 7, 2023

(65) Prior Publication Data

US 2023/0287659 A1 Sep. 14, 2023

(30) Foreign Application Priority Data

Mar. 14, 2022 (KR) .................. 10-2022-0031579

(51) Int. Cl.
*E02F 9/26* (2006.01)
*G06T 11/00* (2006.01)

(52) U.S. Cl.
CPC ............ *E02F 9/261* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 9,030,332 B2 | 5/2015 | Tafazoli Bilandi et al. | |
| 9,616,748 B2* | 4/2017 | Tsubone | B60K 35/232 |
| 10,017,113 B2* | 7/2018 | Izumikawa | H04N 7/181 |
| 10,544,567 B2* | 1/2020 | Petrany | E02F 9/261 |
| 11,975,951 B2* | 5/2024 | Zhao | B66C 23/905 |
| 2015/0343976 A1* | 12/2015 | Lim | E02F 9/261 |
| | | | 340/435 |
| 2024/0141621 A1* | 5/2024 | Eguchi | H04N 7/181 |

FOREIGN PATENT DOCUMENTS

| | | |
|---|---|---|
| EP | 3385457 A1 | 10/2018 |
| EP | 3904610 A1 | 11/2021 |
| JP | 2021019253 A | 2/2021 |
| JP | 2021042638 A | 3/2021 |
| JP | 2021147895 A | 9/2021 |
| KR | 102022000234 A | 1/2022 |

OTHER PUBLICATIONS

Extended European Search Report, EP Application No. 23160876.1, mailed Jul. 24, 2023, 9 pages.

* cited by examiner

*Primary Examiner* — Ryan M Gray
(74) *Attorney, Agent, or Firm* — Sage Patent Group (57) ABSTRACT

An aspect of the present disclosure provides a display system for construction machine including a lower traveling body, an upper rotating body rotatably mounted with respect to the lower traveling body, and a work machine mounted on the upper rotating body, wherein the display system includes an obstacle detecting system for detecting an obstacle near the construction machine and generating information on the obstacle; and a display unit for displaying information generated by the obstacle detecting system.

10 Claims, 8 Drawing Sheets

DISPLAY SYSTEM FOR CONSTRUCTION MACHINE

CROSS-REFERENCE TO RELATED APPLICATION

This application claims priority to and the benefit of Korean Patent Application No. 10-2022-0031579, filed on Mar. 14, 2022, and Korean Patent Application No. 10-2023-0019345, filed on Feb. 14, 2023, the disclosure of which is incorporated herein by reference in its entirety.

TECHNICAL FIELD

The disclosure relates generally to a construction machine. In particular aspects, the disclosure relates to a display system for construction machine which provides information on nearby obstacles. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In general, construction machines such as excavators are configured so that the upper rotating body may freely rotate around the lower traveling body. When operating such construction machines, in other words, when the upper rotating body rotates with respect to the lower traveling body or when the lower traveling body moves backwards, there are blind spots which cannot be seen by the worker operating the construction machine at the driver's seat with the naked eye.

Accordingly, there is a problem that work efficiency deteriorates because the worker needs to operate the construction machine while looking at a mirror provided in the upper rotating body of the construction machine or directly checking the corresponding movement path with the naked eye.

Conventionally, in an excavator, cameras were installed on the left and right sides or rear of the upper rotating body, and obstacles located in blind spots were recognized through images photographed by the cameras. However, images of a corresponding direction are simply displayed on the monitor, and information regarding the distance to the obstacles is not provided.

SUMMARY

According to a first aspect of the disclosure, a display system for construction machine comprising a lower traveling body, an upper rotating body rotatably mounted with respect to the lower traveling body, and a work machine mounted on the upper rotating body, wherein the display system comprises an obstacle detecting system for detecting an obstacle near the construction machine and generating information on the obstacle; and a display unit for displaying the information generated by the obstacle detecting system, is provided. A technical benefit may include a technical effect that workers can easily recognize the location, distance and direction of obstacles near the construction machine.

In some examples, the display unit may display obstacle location information visually indicating the location of an obstacle near the construction machine.

In some examples, the obstacle location information may comprise a plurality of zones which correspond to a detection area of the obstacle detecting system and are arranged along a circumference with respect to a certain point, each zone may be divided into a plurality of sectors along the radial direction of the certain point, and the sector in which an obstacle is located in each zone may be displayed to be distinguished from other sectors.

In some examples, a virtual construction machine may be displayed on the certain point, and the virtual construction machine may be connected to a sector in which the obstacle is located by a line.

In some examples, each sector may be formed in a different color.

In some examples, the detection area of the obstacle detecting system may be limited within a predetermined range for each zone.

In some examples, the sector input through the display unit may be limited to an upper limit of the detection area of the obstacle detecting system.

In some examples, the display unit may display obstacle direction information visually indicating the direction of an obstacle near the construction machine.

In some examples, the obstacle direction information may comprise a plurality of zones which correspond to a detection area of the obstacle detecting system and are arranged along a circumference with respect to a certain point, and displays a zone in which an obstacle is located to be distinguished from other zones.

In some examples, the range of 0 to 45 degrees clockwise with respect to the front of the certain point may be a first zone, the range of 45 to 90 degrees may be a second zone, the range of 90 to 135 degrees may be a third zone, the range of 135 to 180 degrees may be a fourth zone, the range of 180 to 225 degrees may be a fifth zone, the range of 225 to 270 degrees may be a six zone, and the range of 270 to 315 degrees may be a seventh zone.

In some examples, the display unit may display system state information visually indicating whether the obstacle detecting system is normally operating.

In some examples, the system state information may comprise a symbol arranged in a center and a bar arranged along a circumference with respect to the symbol to change continuously.

In some examples, the symbol may be a check or an exclamation mark.

In some examples, the obstacle detecting system may detect from a location spaced a certain distance from the construction machine in the front and both sides of the construction machine.

In some examples, the display unit may display obstacle location information visually indicating the location of an obstacle near the construction machine, obstacle direction information visually indicating the direction of an obstacle near the construction machine, and system state information visually indicating whether the obstacle detecting system is normally operating.

The disclosed aspects, examples (including any preferred examples), and/or accompanying claims may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
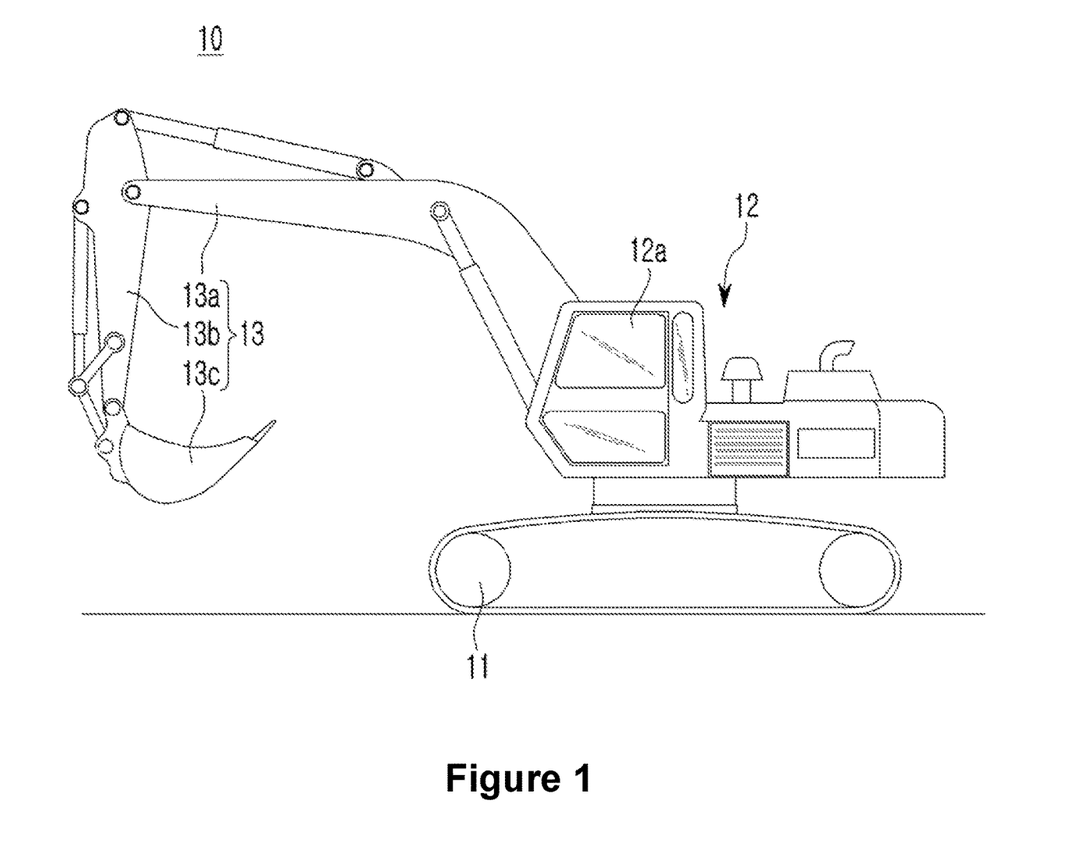
FIG. 1 illustrates an example of a basic configuration of a construction machine.

FIG. 1 illustrates an example of a basic configuration of a construction machine.

Referring to FIG. 1, the construction machine 10 according to an aspect of the present disclosure comprises a lower traveling body 11, an upper rotating body 12 rotatably supported on the lower traveling body 11, and a work machine 13 comprising a boom 13a, an arm 13b, and an attachment 13c each operated by a cylinder and supported on the upper rotating body 12.

The lower traveling body 11 supports the load of the upper rotating body 12 and the work machine 13, and at the same time moves the construction machine in the forward and backward directions for work purpose.

The upper rotating body 12 is supported on the lower traveling body 11 and is designed to rotate on the lower traveling body 11 by a rotating device including a swing motor and a swing reduction gear.

A cabin 12a of the construction machine 10 may be installed on the upper rotating body 12, and a driver's seat in which a construction equipment operator may sit on board may be provided in the cabin 12a. In the front of the driver's seat, a handle or pedal for manipulating work or driving of the construction machine 10 may be diversely provided.

The work machine 13 is installed to be supported on the upper rotating body 12 so as to perform the work of the construction machine 10. Here, work may mean various works in civil engineering and construction sites. The work machine 13 may comprise a boom 13a, an arm 13b, and an attachment 13c operated by respective cylinders, and may be installed being supported toward the front of the upper rotating body 12. Thus, when the upper rotating body 12 rotates, the work machine 13 rotates together with the upper rotating body 12.

Figure 2:
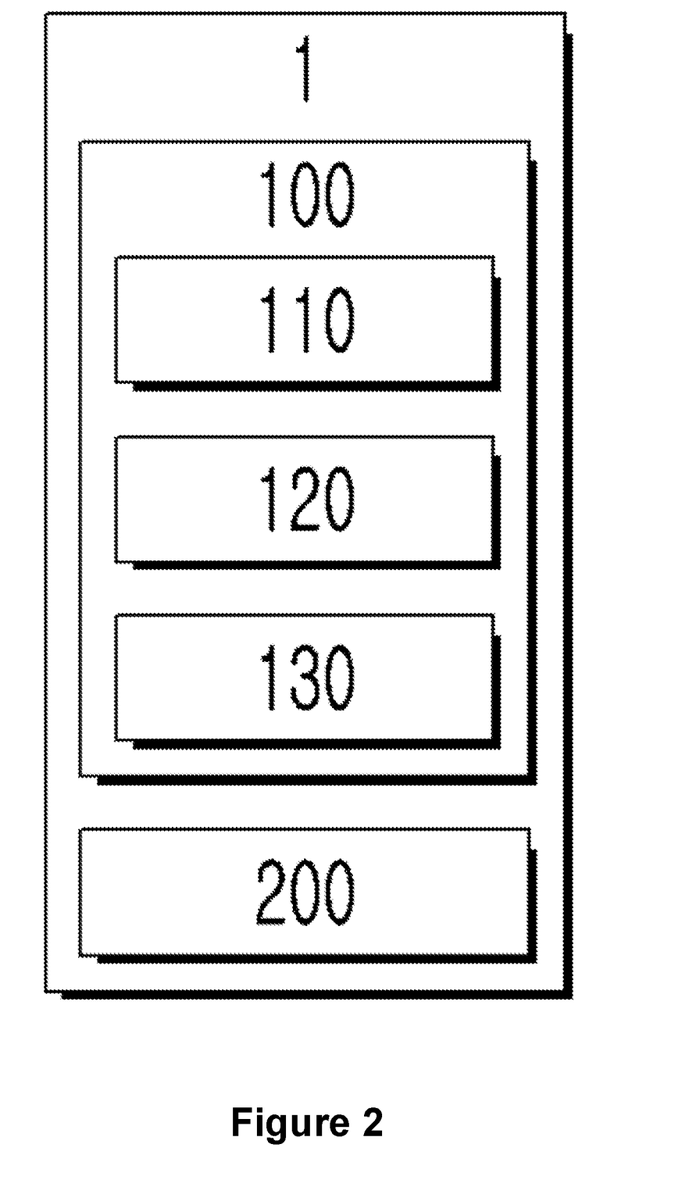
FIG. 2 illustrates an example of a block diagram of a display system for construction machine.

FIG. 2 illustrates an example of a block diagram of a display system for construction machine.

Referring to FIG. 2, the display system 1 of the construction machine according to the present disclosure may comprise an obstacle detecting system 100 which detects obstacles near the construction machine 10 and generates information on the obstacles, and a display unit 200 which displays information generated by the obstacle detecting system 100.

The obstacle detecting system 100 may comprise a sensing unit 110, a photographing unit 120 and a control unit 130.

The sensing unit 110 comprises a plurality of sensors which sense the distance to an object. The plurality of sensors may comprise any one or more of an ultrasonic sensor, an infrared sensor, and a radar.

For example, the sensing unit 110 may derive a distance between an obstacle and a vehicle, and a distance between an obstacle and a bucket based on the reception amount of ultrasonic waves radiated to an object or arrival time. The sensing unit 110 transmits the derived distance information to the control unit 130.

The photographing unit 120 comprises a plurality of cameras which are mounted on the construction machine 10 and have an angle of view capable of photographing the front, rear, left and right surfaces of the construction machine 10. During driving and working, images of the front or rear of the construction machine 10 are obtained, and the obtained photographed images are transmitted to the control unit 130.

Although not illustrated in the drawings, the plurality of cameras may comprise a front camera, a rear camera, a left camera and a right camera for photographing the front, rear, left and right sides of the construction machine 10, respectively.

Figure 3:
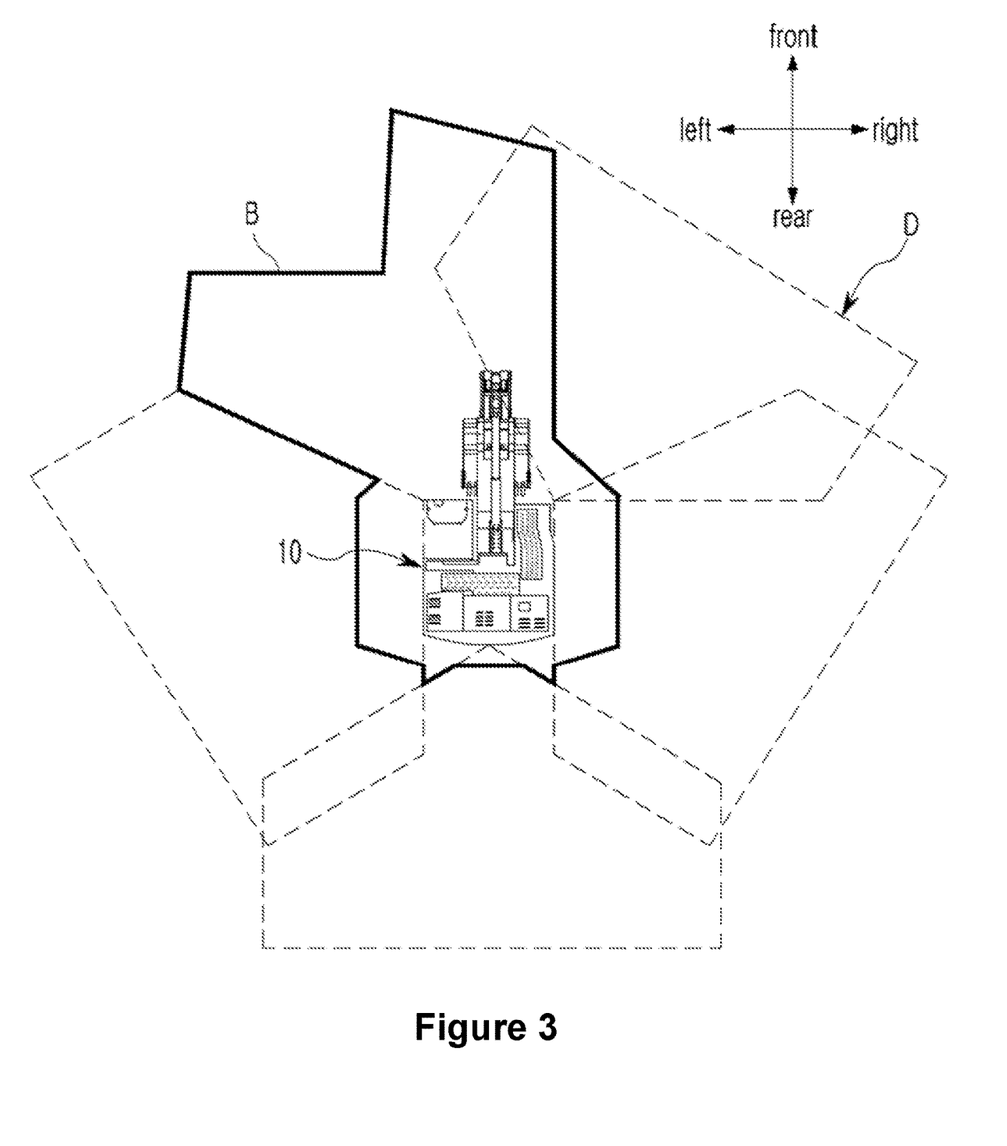
FIG. 3 illustrates an example of an obstacle detection area of an obstacle detecting system.

FIG. 3 illustrates an example of an obstacle detection area of an obstacle detecting system. For example, as illustrated in FIG. 3, in the case of an obstacle located in the range of approximately 0 to 315 degrees clockwise with respect to the front of the construction machine 10, the sensing unit 110 or the photographing unit 120 may detect the location of the obstacle. The zone of approximately 315 to 360 degrees of the construction machine 10 is an area where the driver may identify the location of the obstacle with the naked eye, and thus obstacles in the corresponding area do not have to be detected by the sensing unit 110 or the photographing unit 120. In other words, the zone of approximately 0 to 315 degrees clockwise with respect to the front of the construction machine 10 is part of an obstacle detection area D where obstacles may be detected by the obstacle detecting system, and the zone of approximately 315 to 360 degrees clockwise with respect to the front of the construction machine 10 is part of a non-detection area B where obstacles may not be detected by the obstacle detecting system.

The control unit 130 detects an obstacle based on the sensing information of the sensing unit 110 and the photographed images of the photographing unit 120, and generates information on the obstacle. In addition, one image data is generated by combining at least one photographed image of the plurality of cameras of the photographing unit 120. For example, the control unit 130 may generate an around view using front and rear photographed images of the construction machine 10, and display the same on the display unit 200.

Meanwhile, when the obstacle detecting system 100 detects a distance too close from the front and both sides, the obstacle detecting system 100 may detect the lower traveling body when the work machine rotates.

Accordingly, the obstacle detecting system 100 may detect an obstacle from a location spaced by a certain distance from the construction machine 10 in the front and both sides of the construction machine 10.

The display unit 200 may be a separate display screen provided inside the driver's cab, and may display an image generated by the control unit 130. In addition, the display unit 200 may display information on obstacles generated from the control unit 130.

Figure 4:
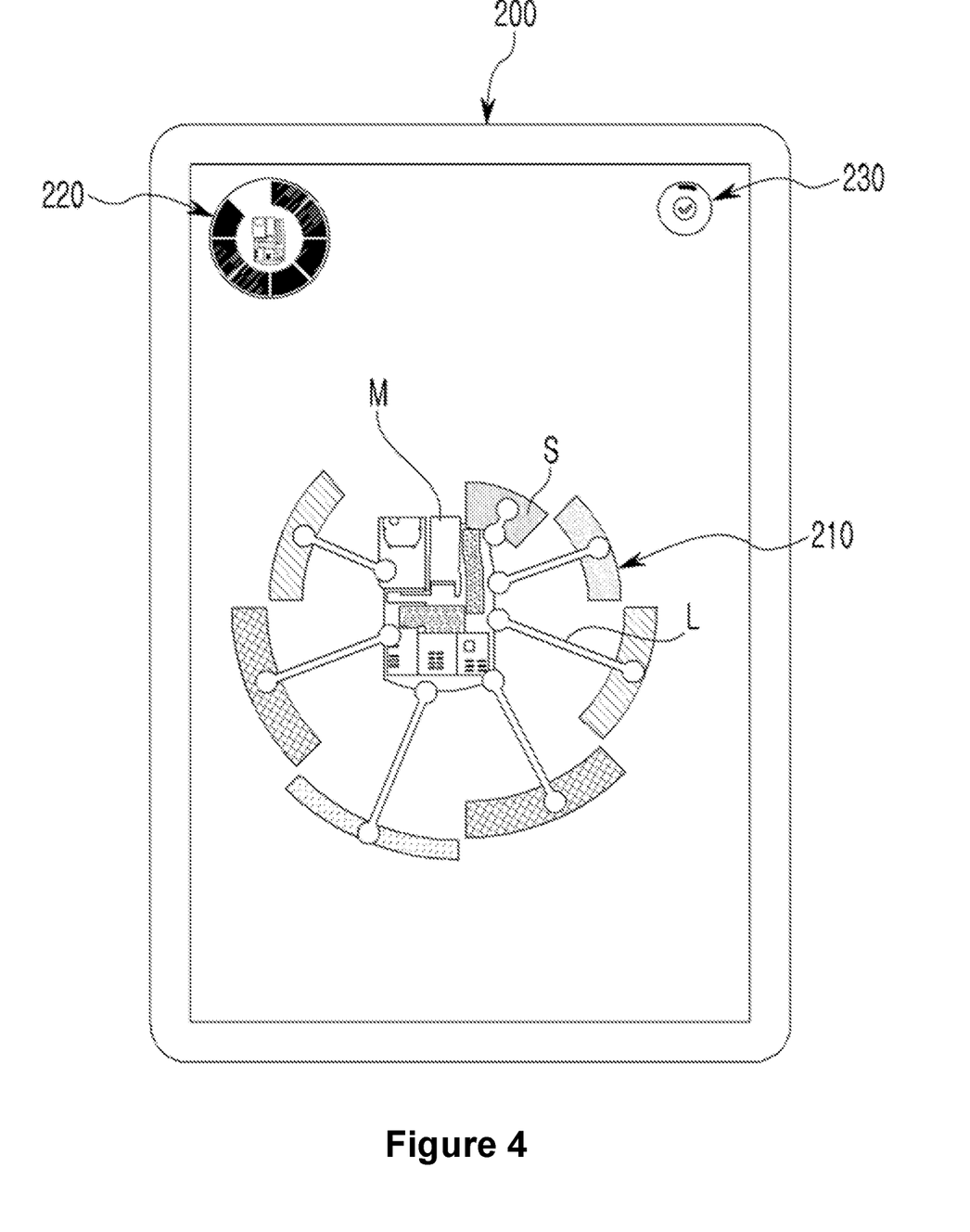
FIG. 4 illustrates an example of a display unit of a display system for construction machine.

FIG. 4 illustrates an example of a display unit of a display system for construction machine. Specifically, as illustrated in FIG. 4, the display unit 200 may display obstacle location information 210, obstacle direction information 220 and system state information 230.

Obstacle location information 210 visually indicates the location of an obstacle near the construction machine, and may be located in the center of the display unit 200.

Figure 5:
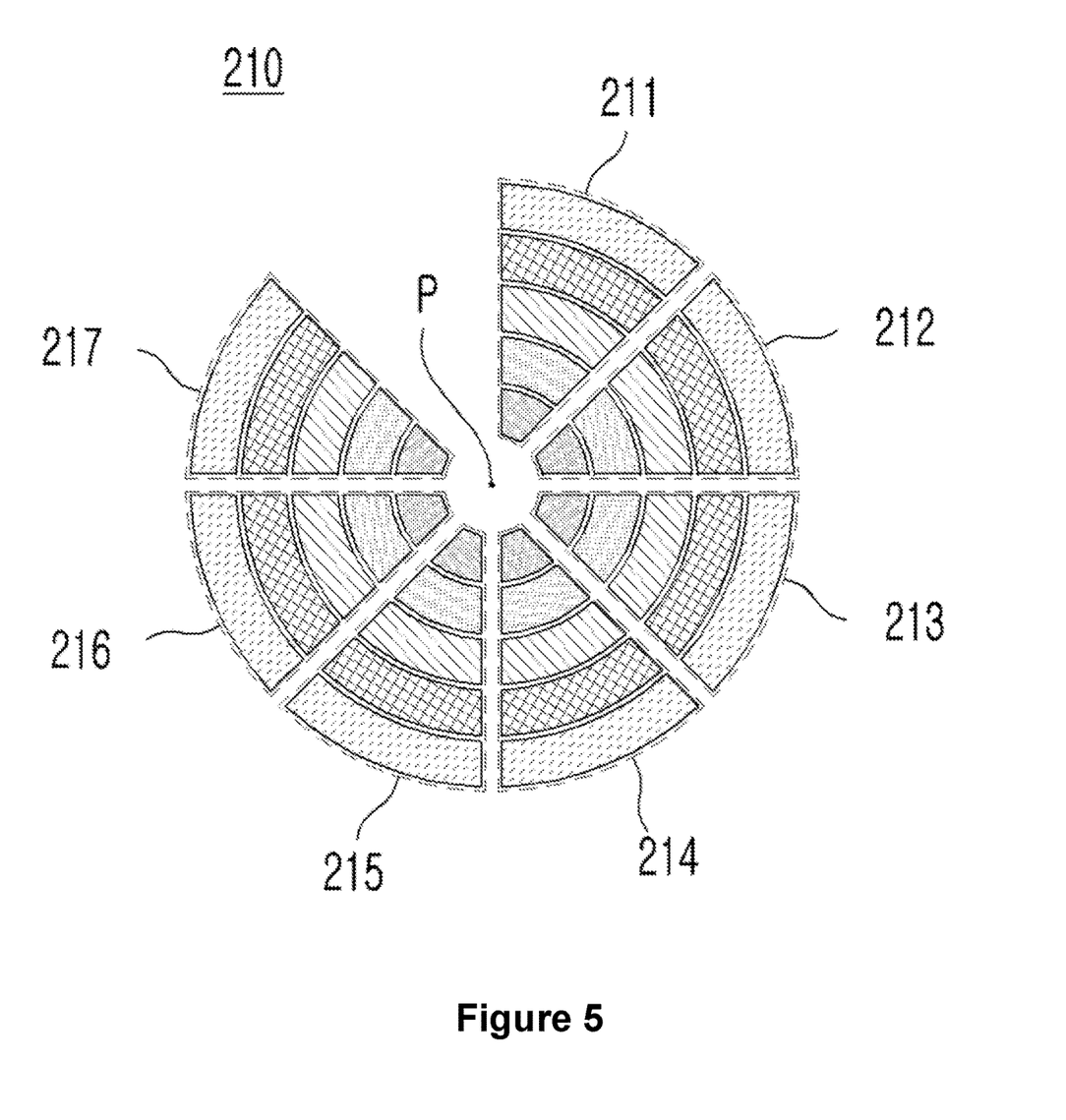
FIG. 5 illustrates an example of a plurality of zones of obstacle location information.

FIG. 5 illustrates an example of a plurality of zones of obstacle location information.

Obstacle location information 210 may comprise a plurality of zones which correspond to the obstacle detection area of the above-described construction machine and is arranged along the circumference with respect to a certain point P.

For example, as illustrated in FIG. 5, the range of 0 to 45 degrees clockwise with respect to the front of a certain point P may be defined as a first zone 211, the range of 45 to 90 degrees as a second zone 212, the range of 90 to 135 degrees as a third zone 213, the range of 135 to 180 degrees as a fourth zone 214, the range of 180 to 225 degrees as a fifth zone 215, the range of 225 to 270 degrees as a six zone 216, and the range of 270 to 315 degrees as a seventh zone 217. Here, a virtual construction machine M may be displayed on the certain point P.

That is, the first zone 211 to the seventh zone 217 may correspond to an obstacle detection area D corresponding to a range of approximately 0 to 315 degrees clockwise with respect to the front of the construction machine 10 illustrated in FIG. 3.

As described above, in case of the range of 315 to 360 degrees clockwise with respect to the front of the construction machine, which is a zone close to the cabin where the worker is located, the worker can see the obstacle with the naked eye, and thus the corresponding area does not have to be indicated as a separate zone.

Figure 6:
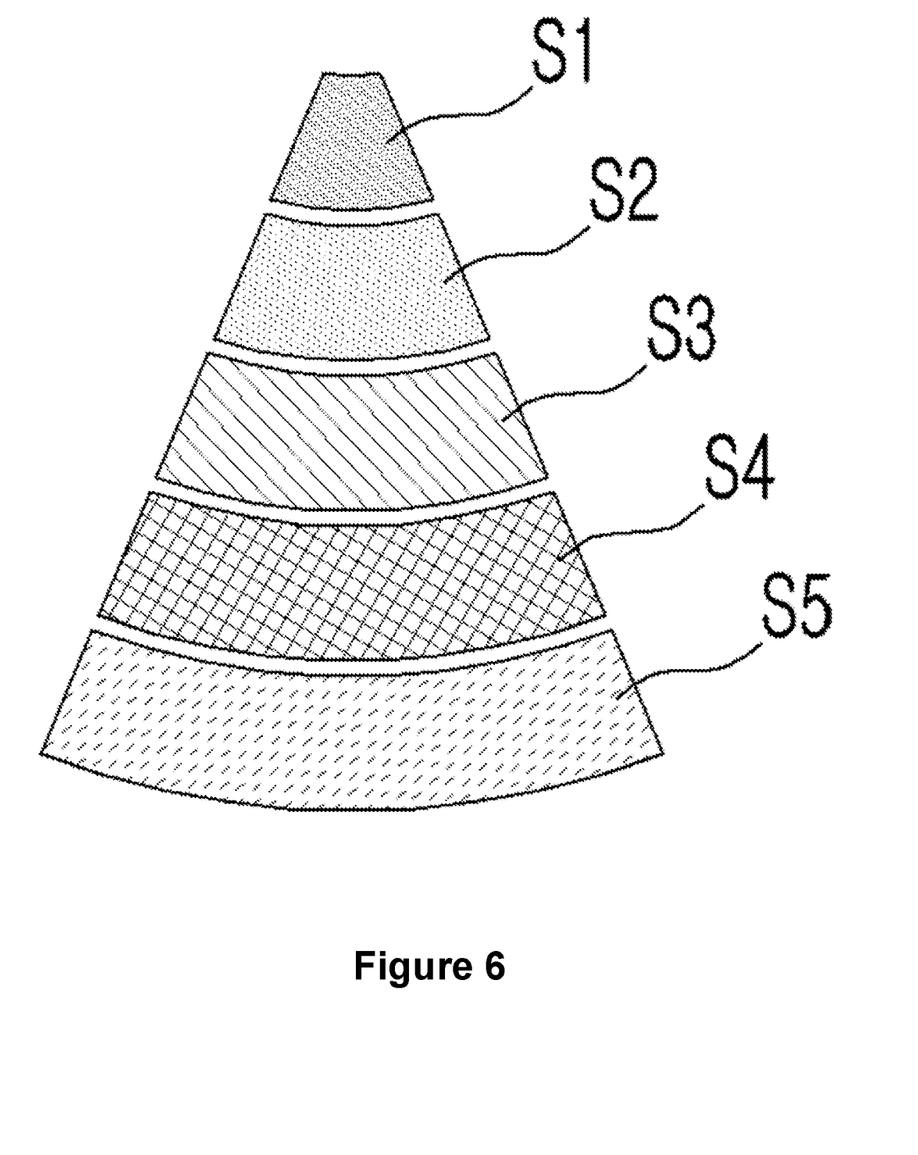
FIG. 6 illustrates an example of a plurality of sectors of obstacle location information.

In addition, each zone may be divided into a total of five sectors S1 to S5. FIG. 6 illustrates an example of a plurality of sectors of obstacle location information. Specifically, as illustrated in FIGS. 5 and 6, each zone may be divided into a first sector S1 to a fifth sector S5, in order, along the radial direction from the center. Preferably, each sector may be formed in the shape of an arc.

This indicates that the closer the sector is to the center, the closer the obstacle is to the construction machine, and the farther the sector is from the center, the farther the obstacle is from the construction machine. In other words, the sector may correspond to the distance spaced from the construction machine.

Meanwhile, as described above, since the obstacle detecting system detects from a location spaced by a certain distance in the front and both sides of the construction machine, the range covered by each sector may be different in the zone located in the rear of the construction machine and the zone located in the front, left or right side of the construction machine.

For example, in the first zone 211 to the third zone 213, the sixth zone 216 and the seventh zone 217 located in the front, left or right side of the construction machine, a first sector S1 means a range of 2 to 3 m from the construction machine, a second sector S2 means a range of 3 to 4 m from the construction machine, a third sector S3 means a range of 4 to 5 m from the construction machine, a fourth sector S4 means a range of 5 to 6 m from the construction machine, and a fifth sector S5 means a range of 6 to 7 m from the construction machine.

In the fourth zone 214 and the fifth zone 215 located in the rear of the construction machine, a first sector S1 means a range of 0 to 2 m from the construction machine, a second sector S2 means a range of 2 to 3 m from the construction machine, a third sector S3 means a range of 3 to 4 m from the construction machine, a fourth sector S4 means a range of 4 to 5 m from the construction machine, and a fifth sector S5 means a range of 5 to 7 m from the construction machine.

In addition, each sector may be formed in a different color and displayed to be distinguished from each other. For example, each sector may be formed in red when closer to the center and may be formed in yellow when farther from the center.

When obstacle location information 210 is displayed, a sector in which an obstacle is located may be displayed to be distinguished from other sectors for each zone. Preferably, when obstacle location information 210 is displayed, only one sector corresponding to the distance between the construction machine and the obstacle may be displayed for each zone.

For example, referring to FIGS. 4 to 6, when an obstacle is detected within 2 to 3 m in the first zone 211, a first sector S1 may be displayed. When an obstacle is detected within 3 to 4 m in the second zone 212, a second sector S2 may be displayed. When an obstacle is detected within 4 to 5 m in the third zone 213, a third sector S3 may be displayed. When an obstacle is detected within 4 to 5 m in the fourth zone 214, a fourth sector S4 may be displayed. When an obstacle is detected within 5 to 7 m in the fifth zone 215, a fifth sector S5 may be displayed. When an obstacle is detected within 5 to 6 m in the sixth zone 216, a fourth sector S4 may be displayed. When an obstacle is detected within 4 to 5 m in the seventh zone 217, a third sector S3 may be displayed.

Preferably, as illustrated in FIG. 4, the obstacle location information 210 may include a line L connecting each sector S and a virtual construction machine M located in the center. The worker may intuitively figure out the distance between the construction machine and the obstacle based on the obstacle location information 210.

Meanwhile, the detection area in which the obstacle detecting system 100 may detect an obstacle may be limited within a predetermined range. For example, when the detection area of the obstacle detecting system 100 is limited to 0 to 3 m, obstacles in the range of 0 to 3 m with respect to the construction machine are detected, and obstacles in a range therebeyond may not be detected. As such, the detection area of the obstacle detecting system 100 may be limited individually for each zone.

Preferably, the worker may select one sector through a display unit 200 and limit the upper limit of the detection area. For example, based on the fourth zone 214 mentioned above, when the third sector S3 is selected, the detection area of the obstacle detecting system 100 may be limited to a range of 0 to 4 m from the construction machine.

Preferably, the worker may select two or more sectors through a display unit 200 and limit the lower limit and the upper limit of the detection area. For example, based on the fourth zone 214 mentioned above, when the second sector S2 and the fourth sector S4 are selected, the detection area of the obstacle detecting system 100 may be limited to a range of 3 to 5 m from the construction machine.

As illustrated in FIG. 4, obstacle direction information 220 is information visually indicating whether there is an obstacle near the construction machine, and may be located at the top left of the display unit 200.

Figure 7:
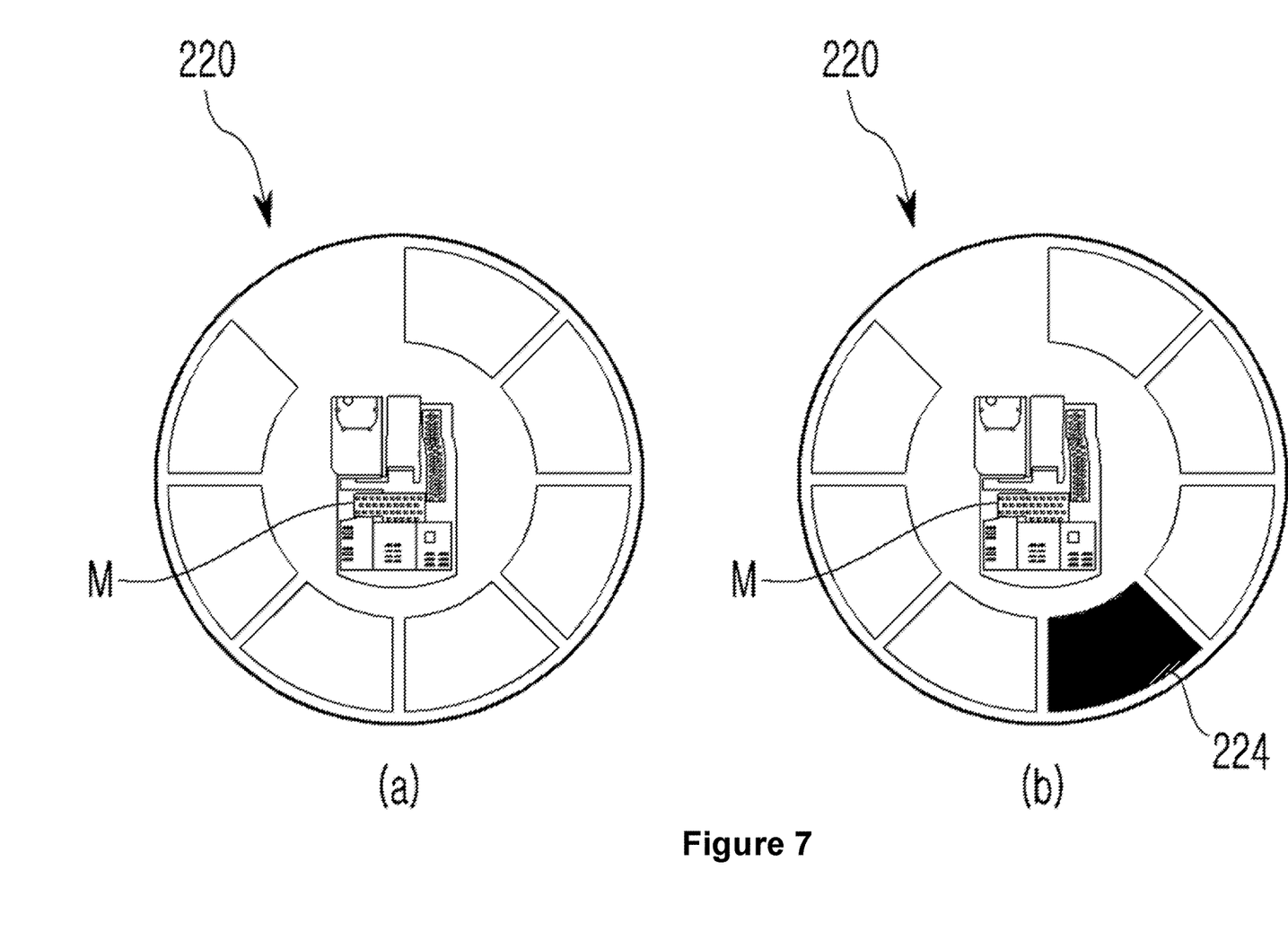
FIG. 7 illustrates an example of obstacle direction information.

FIG. 7 illustrates an example of obstacle direction information. Specifically, obstacle direction information 220 has zones corresponding to the zones of the obstacle location information 210 described above, but each zone in the obstacle direction information 220 is not divided into sectors. A virtual construction machine M may be displayed in the center of the obstacle direction information 220.

Preferably, when an obstacle is detected in a corresponding zone, obstacle direction information 220 may display a zone in which the obstacle is detected from other zones. For example, a zone in which no obstacle is detected may be displayed in a first color and a zone in which an obstacle is detected may be displayed in a second color.

As illustrated in FIG. 7(a), when no obstacle is detected near the construction machine, all zones of the obstacle direction information 220 may be displayed in a first color.

As illustrated in FIG. 7(b), when an obstacle is detected only in the fourth zone 224, obstacle direction information 220 may display the fourth zone 224 in a second color which is distinguished from other zones.

In addition, as illustrated in FIG. 4, when obstacles are detected in all zones, all zones of the obstacle direction information 220 may be displayed in a second color.

As illustrated in FIG. 4, system state information 230 is information visually indicating whether the obstacle detecting system is normally operating, and may be located at the upper right of the display unit 200.

Figure 8:
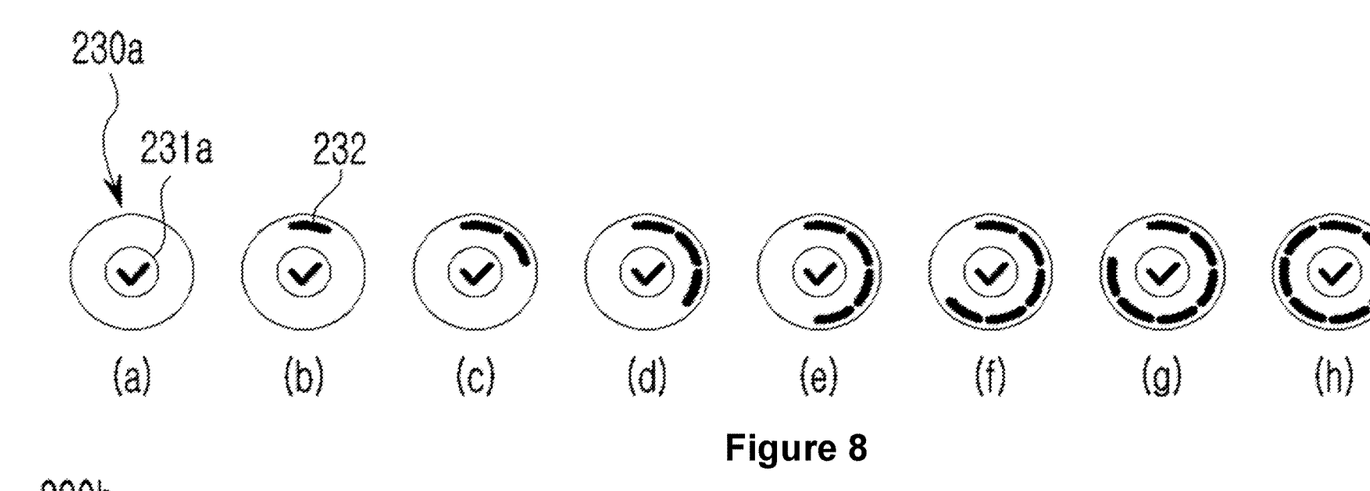
FIG. 8 illustrates an example of system state information when the obstacle detecting system normally operates.
Figure 9:
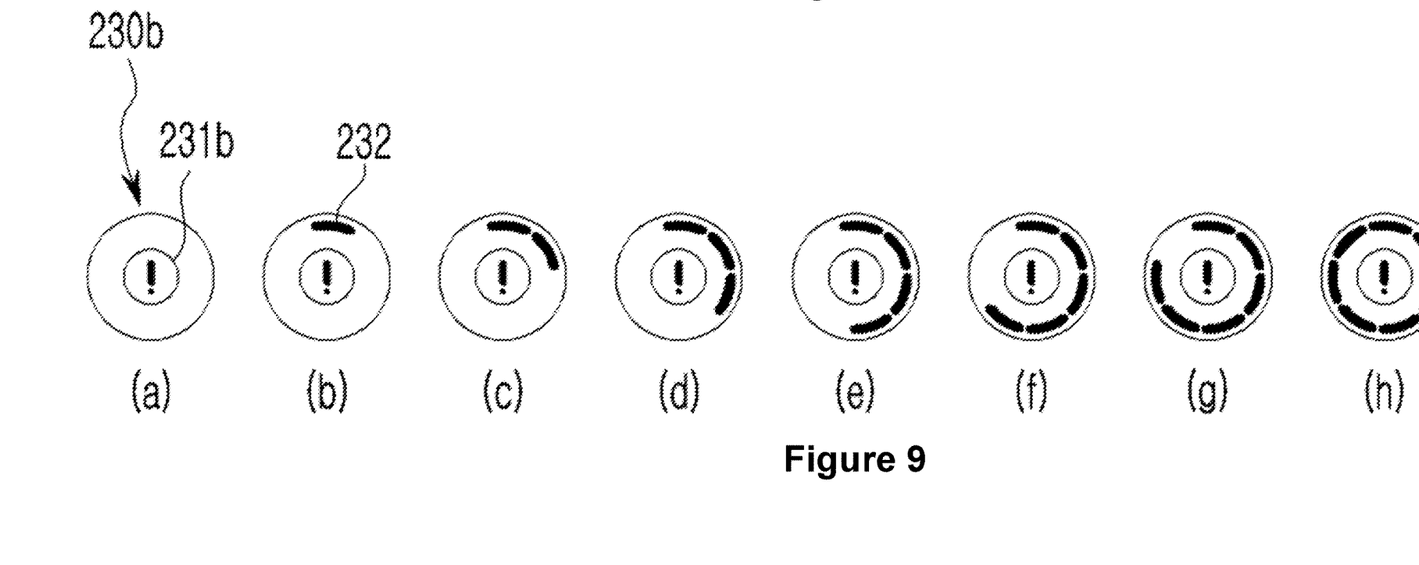
FIG. 9 illustrates an example of system state information when the obstacle detecting system abnormally operates.

FIG. 8 illustrates an example of system state information when the obstacle detecting system normally operates. FIG. 9 illustrates an example of system state information when the obstacle detecting system abnormally operates.

As illustrated in FIG. 8, system state information 230a may include a checkmark symbol 231a and a bar 232 arranged along the circumference with respect to the checkmark symbol 231a. Specifically, when the obstacle detecting system normally operates, the system state information 230a may be displayed so that the bar 232 continuously changes clockwise together with the checkmark symbol 231a. In other words, when the bar does not change continuously, the driver may know that the screen is not operating properly.

As illustrated in FIG. 9, system state information 230b may include an exclamation mark symbol 231b and a bar 232 arranged along the circumference with respect to the exclamation mark symbol 231b. Specifically, for example, when the obstacle detecting system abnormally operates such as when the screen is not properly displayed due to camera failure, the system state information 230b may be displayed so that the bar 232 continuously changes clockwise together with the exclamation mark symbol 231b. In other words, when the bar does not change continuously, the driver may know that the screen is not operating properly.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A display system for construction machine comprising a lower traveling body, an upper rotating body rotatably mounted with respect to the lower traveling body, and a work machine mounted on the upper rotating body,
   wherein the display system comprises an obstacle detecting system for detecting an obstacle near the construction machine and generating information on the obstacle; and
   a display unit for displaying the information generated by the obstacle detecting system,
   wherein the display unit displays obstacle location information visually indicating the location of an obstacle near the construction machine,
   wherein the obstacle location information comprises a plurality of zones which correspond to a detection area of the obstacle detecting system and are arranged along a circumference with respect to a certain point, each zone is divided into a plurality of sectors along the radial direction of the certain point, and the sector in which an obstacle is located in each zone is displayed to be distinguished from other sectors,
   wherein the range of 0 to 45 degrees clockwise with respect to the front of the certain point is a first zone, the range of 45 to 90 degrees is a second zone, the range of 90 to 135 degrees is a third zone, the range of 135 to 180 degrees is a fourth zone, the range of 180 to 225 degrees is a fifth zone, the range of 225 to 270 degrees is a six zone, and the range of 270 to 315 degrees is a seventh zone.

2. The display system for construction machine of claim 1, wherein a virtual construction machine is displayed on the certain point, and the virtual construction machine is connected to a sector in which the obstacle is located by a line.

3. The display system for construction machine of claim 1, wherein each sector is formed in a different color.

4. The display system for construction machine of claim 1, wherein the detection area of the obstacle detecting system is limited within a predetermined range for each zone.

5. The display system for construction machine of claim 4, wherein the sector input through the display unit is limited to an upper limit of the detection area of the obstacle detecting system.

6. A display system for construction machine comprising a lower traveling body, an upper rotating body rotatably mounted with respect to the lower traveling body, and a work machine mounted on the upper rotating body,
wherein the display system comprises an obstacle detecting system for detecting an obstacle near the construction machine and generating information on the obstacle; and
a display unit for displaying the information generated by the obstacle detecting system,
wherein the display unit displays obstacle direction information visually indicating the direction of an obstacle near the construction machine,
wherein the obstacle direction information comprises a plurality of zones which correspond to a detection area of the obstacle detecting system and are arranged along a circumference with respect to a certain point, and displays a zone in which an obstacle is located to be distinguished from other zones,
wherein the range of 0 to 45 degrees clockwise with respect to the front of the certain point is a first zone, the range of 45 to 90 degrees is a second zone, the range of 90 to 135 degrees is a third zone, the range of 135 to 180 degrees is a fourth zone, the range of 180 to 225 degrees is a fifth zone, the range of 225 to 270 degrees is a six zone, and the range of 270 to 315 degrees is a seventh zone.

7. A display system for construction machine comprising a lower traveling body, an upper rotating body rotatably mounted with respect to the lower traveling body, and a work machine mounted on the upper rotating body,
wherein the display system comprises an obstacle detecting system for detecting an obstacle near the construction machine and generating information on the obstacle; and
a display unit for displaying the information generated by the obstacle detecting system,
wherein the display unit displays system state information visually indicating whether the obstacle detecting system is normally operating,
wherein the system state information comprises a symbol arranged in a center and a bar arranged along a circumference with respect to the symbol to change continuously.

8. The display system for construction machine of claim 7, wherein the symbol is a check or an exclamation mark.

9. The display system for construction machine of claim 1, wherein the obstacle detecting system detects from a location spaced a certain distance from the construction machine in the front and both sides of the construction machine.

10. The display system for construction machine of claim 1, wherein the display unit displays:
obstacle location information visually indicating the location of an obstacle near the construction machine,
obstacle direction information visually indicating the direction of an obstacle near the construction machine, and
system state information visually indicating whether the obstacle detecting system is normally operating.

* * * * *